United States Patent Office 3,591,598
Patented July 6, 1971

3,591,598
CERTAIN CONDENSATION PRODUCTS DERIVED FROM MANNICH BASES
Thornton P. Traise, Chicago Heights, Ill., and Roger W. Watson, Highland, and Randel Q. Little, Munster, Ind., assignors to Standard Oil Company, Chicago, Ill.
No Drawing. Filed Nov. 8, 1968, Ser. No. 774,497
Int. Cl. C07d *31/42*
U.S. Cl. 260—296
5 Claims

ABSTRACT OF THE DISCLOSURE

This invention concerns the condensation product of an aldehyde reactant having more than one carbon atom and/or ketone reactant, formaldehyde, an alkylene polyamine, and an alkyl-substituted phenol and/or a methyl-substituted amino pyridine. These compositions can be used as ashless alkaline additives for motor oils.

BACKGROUND OF THE INVENTION

Known lubricating oils for engines develop acidic materials which react with the oil to form sludge and varnish that interfere with the operation of the engine. The addition of alkaline additives to oils neutralizes the acidic materials, rendering them harmless. Many conventional additives include metals, and these metal-containing additives make their way into the combustion chamber of the engine and are burned, leaving an ash, which hampers the performance of the engine, and which is occasionally blown from the exhaust as red-hot particles that can cause fires. Researchers, in attempting to find ashless additives which are soluble or miscible in lubricating oil and which themselves do not harm engine parts, have investigated low molecular weight Mannich compounds. However, at effective concentrations, many of these Mannich compounds are immiscible with or insoluble in motor oils.

SUMMARY OF THE INVENTION

We have discovered novel compositions which serve as highly active ashless alkaline additives for oil. These compositions, which are oil soluble or oil miscible, can be made by either of two methods. The first, and preferred method, calls for reacting an aldehyde reactant having more than one carbon atom, or a ketone reactant, or a mixture of said aldehyde and ketone reactants with the following Mannich condensation products: (1) Mannich products formed by the condensation of an alkyl-substituted phenol, formaldehyde, and an alkylene polyamine; and (2) Mannich condensation products formed by the condensation of a methyl-substituted aminopyridine, formaldehyde, and an alkylene polyamine. The second method calls for reacting an aldehyde reactant having more than one carbon atom, or a ketone reactant, or a mixture of said aldehyde and ketone reactants with an alkylene polyamine to form an intermediate, and then reacting the intermediate with formaldehyde and an alkyl-substituted phenol, or a methyl-substituted amino pyridine, or a mixture of alkyl-substituted phenol and methyl amino pyridine. The reactions are exothermic, but we usually heat the reaction mixture to a temperature between about 100° C. and about 200° C., preferably between about 110° C. and about 180° C. This additional heating drives the reactions to substantial completion and removes water of condensation from the product.

The above-mentioned Mannich condensation products, (1) and (2), are strong anti-acids. But, if they have a low molecular weight, they are not readily soluble in oil. We have found that these low molecular weight Mannich condensation products react with aldehydes and ketones to produce excellent alkaline additives which are soluble or miscible in oil. Oils containing a minor amount of the alkaline additives of our invention, generally from about 5 to about 20 weight percent, do not deleteriously affect engines, and in fact that have many advantages in use.

The reaction between the various starting materials is very complex, and therefore, we cannot demonstrate with certainty the precise formula of the alkaline additives of our invention. We do, however, know that the carbonyl group of the aldehyde reactant or ketone reactant is capable of reacting with one or more of the several different reactive amino groups available. The following equations show some of the possible reactions and illustrate said complexity:

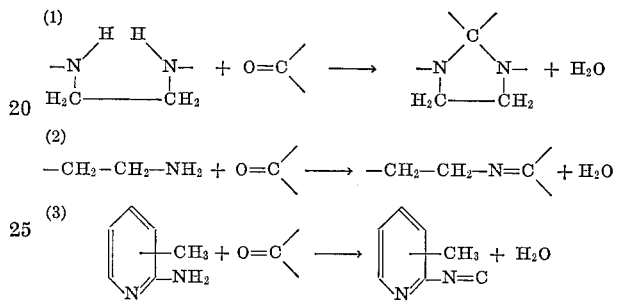

Equation 1 illustrates the reaction between the secondary amino group of the polyamine moiety and the carbonyl group of the aldehyde reactant or ketone reactant to form a cyclic group. Equation 2 illustrates the reaction between the primary amino group of the polyamine moiety and the carbonyl group of the aldehyde reactant or ketone reactant to form an imine group. Equation 3 illustrates the reaction between the primary amino group of the pyridine and the carbonyl group of the aldehyde reactant or ketone reactant to form an imine group which is attached to the pyridine nucleus. Only one of these reactions may be dominating, but it is possible that all occur simultaneously and at about the same rate. Because of the availability of so many different reactive amino groups, the amount of aldehyde and/or ketone reactants used may vary greatly. The only criterion is that the aldehyde and/or ketone reactants be added until the condensation product is soluble in oil. In general, formaldehyde, polyamine, and the substituted phenol, substituted pyridine, or mixtures of said phenol and pyridine are reacted in the respective molar ratios of about 1–2:1–2:1. When the formaldehyde, polyamine, and phenol and/or pyridine are reacted in these relative proportions, generally from 1–4 moles of aldehyde and/or ketone reactant is employed.

Preferably the aldehyde and ketone reactants have at least 6 carbon atoms. The greater number of carbon atoms in the aldehyde and ketone reactants and the greater the branching of the hydrocarbon chain of these reactants, the more oil soluble the condensation product. We especially prefer those aldehyde and ketone reactants having branched alkyl groups containing from 6 to 18 carbon atoms. Examples of suitable aldehyde reactants are: hexanal, heptanal, 2-methyl heptanal, 2-ethyl heptanal, 2-methyl - 4 - ethyl heptanal, 3-methyl decanal, 3,5-dimethyl decanal, 3-ethyl - 5 - methyl decanal, 5-butyl decanal, 5-methyl - 6 - butyl decanal, 5-methyl pentadecanal, 5-ethyl pentadecanal, and 3-methyl heptadecanal. Examples of suitable ketone reactants are: 2-hexanone, 3-heptanone, 3-octanone, 2-methyl-3-octanone, 2-ethyl - 3 - octanone, 5-methyl-3-decanone, 5-ethyl-3-decanone, 5-propyl-3-decanone, 5-propyl - 3 - undecanone, 5-penta - 3 - decanone, 2-methyl - 5 - pentadecanone, 2-ethyl-5-pentadecanone, and 2-propyl-5-pentadecanone.

The alkyl substituents of preferred alkyl-substituted phenols contain less than about 40 carbon atoms, and most preferably contain branched alkyl groups from about 1 to about 18 carbon atoms. The preferred methyl-substituted-aminopyridine is 2-amino - 4,6 - dimethyl pyridine. Other suitable methyl-substituted-aminopyridines are: alpha-picoline, beta-picoline, and gamma-picoline.

Suitable alkylene polyamines generally come within the following formula:

$$H_2N(\text{---alkylene---NH})_nH$$

in which $n$ is an integer from about 1 to about 10, and "alkylene" is a saturated divalent hydrocarbon having from about 2 to about 8 carbon atoms. The preferred alkylene polyamines are ethylene polyamines ("alkylene" having 2 carbon atoms) of which tetraethylene pentamine is the most preferred. Other alkylene polyamines include, for example, propylene polyamines, butylene polyamines, and cyclic homologues of such polyamines, for example piperazines. Specific examples of still other alkylene polyamines are: ethylene diamine, diethylene triamine, pentaethylene tetramine, and N-2-aminoethyl-piperazine.

PREPARATION OF TYPE 1 MANNICH CONDENSATION PRODUCT

Mix 5 moles of p-nonylphenol and 10 moles of tetraethylene pentamine in a suitable flask fitted with stirring apparatus, reflux condenser, a Barrett trap, and a nitrogen inlet tube. Then, with stirring, slowly add to the flask over a period of about two hours 10 moles of formaldehyde dissolved in water (63 weight percent water). As formaldehyde is added, the temperature of the reaction mixture rises from ambient to about 70° C. When all the formaldehyde is added, stop stirring, inject nitrogen into the reaction mixture as an aid in removing water, and heat for several hours (about 36), gradually increasing temperature from 70° to 160° C. to remove the water added with the formaldehyde and the water formed during the condensation reaction. The water collects in the Barrett trap. A Mannich condensation product (Type 1) so prepared has an average molecular weight of about 557.

PREPARATION OF TYPE 2 MANNICH CONDENSATION PRODUCT

Mix 5 moles of 2-amino-4,6-dimethyl pyridine and 10 moles of tetraethylene pentamine in a suitable flask fitted with stirring apparatus, a Barrett trap, and a nitrogen inlet tube. Then, with stirring, slowly add to the mixture over a period of about two hours 10 moles of formaldehyde dissolved in water (63 weight percent water). As the formaldehyde is added, the temperature of the reaction mix rises from ambient to about 97° C. When all the formaldehyde is added, stop stirring, inject nitrogen into the reaction mixture, and then heat the mix for several hours (about 36), gradually increasing the temperature from 97° to 185° C. A Mannich condensation product (Type 2) so prepared has an average molecular weight of about 525.

DESCRIPTION OF THE PREFERRED EMBODIMENTS

Example I

Dissolve 1.8 moles of Type 1 Mannich product in 500 milliliters of isopropyl alcohol contained in a suitable flask fitted with a reflux condenser, stirring apparatus, a Barrett trap, and a nitrogen inlet tube. With stirring, slowly add to the flask over a period of about one hour 3 moles of a mixture of branched chain aldehydes containing 10 carbon atoms (Enjay Chemical Co. MD–223). As this mixture of aldehydes is added, the temperature of the reaction will rise from ambient to about 55° C. When all the aldehyde is added, inject nitrogen into the reaction mixture, and heat the mixture for several hours (about 36), gradually increasing the temperature from 55° to 170° C. to remove the alcohol and by-product water. An alkaline additive so prepared has a molecular weight of about 600, and is readily dispersed in SAE–5W oil. To make this additive even more oil soluble, it is reacted with more aldehydes as described in Example II.

Example II

In a suitable flask, mix 1.2 moles of the alkaline additive made in Example I with 700 grams of SAE–5W oil. Then, with stirring, slowly add to the mixture over a period of about 35 minutes 0.9 mole of the mixture of $C_{10}$ aldehydes. As the aldehyde is added, the temperature of the reaction mixture rises from ambient to about 36° C. Cover the mixture with nitrogen and heat at 150° C. for about two hours, and then cool. The alkaline additive thus prepared is a bright amber oily material which is soluble in hot oil.

Example III

Fill a suitable flask fitted with stirring apparatus, a Barrett trap, and nitrogen inlet tube with 2 moles of Type 2 Mannich condensation product and feed nitrogen into the flask. With stirring, slowly add to the flask over a period of about three hours about 4 moles of the mixture of $C_{10}$ aldehydes. As the aldehyde is added, the temperature of the reaction mixture rises from ambient to 45° C. Inject nitrogen and heat the reaction mixture for several hours (about 16), gradually increasing the temperature from 45° to 147° C. The alkaline additive so prepared has an average molecular weight of about 248, and forms a hazy suspension in SAE–5W oil. To make a product which is clear and bright, the additive of this example is further reacted with aldehyde.

Example IV

Mix 0.6 mole of the alkaline additive of Example III with 500 grams of SAE–5W oil, and then slowly add 0.4 mole of the mixture of $C_{10}$ aldehydes. Heat for several hours (about 36) while injecting nitrogen, gradually increasing the temperature to 152° C. The alkaline additive thus produced is completely soluble in SAE–5W oil.

Example V

Dissolve 1.8 moles of Type 1 Mannich in 500 grams of SAE–5W oil contained in a suitable flask fitted with the necessary stirring, reflux, and nitrogen feed equipment. Inject nitrogen into the flask, and slowly, with stirring, add to the flask over a period of about one hour 4 moles of the mixture of $C_{10}$ aldehydes. Then heat for several hours while injecting nitrogen. An alkaline additive so prepared is soluble in hot oil.

Example VI

Dissolve 2 moles of Type 2 Mannich condensation product in 500 grams of SAE–5W oil contained in a suitable flask fitted with the previously mentioned equipment. Add to the flask, with stirring, 6 moles of the mixture of $C_{10}$ aldehydes, and then heat for several hours while injecting nitrogen. An alkaline additive so prepared is soluble in oil.

Example VII

In a suitable flask fitted with suitable equipment, mix 1 mole of tetraethylene pentamine with 1 mole of 3-ethyl-5-methyl decanal and 1 mole of 2-methyl-3-octanone, and heat for several hours and inject nitrogen to remove by-product water. Dissolve 1 mole of the reaction product of tetraethylene pentamine and the aldehyde and ketone mixture in 500 grams of SAE–5W oil, and to this solution add 0.25 mole of 2-amino-4,6-dimethyl pyridine, 0.25 mole of p-nonylphenol, and 1 mole of formaldehyde. Then heat for several hours while injecting nitrogen. An alkaline additive so prepared is soluble in oil.

Example VIII

In a suitable flask fitted with suitable equipment, mix 1 mole of Type 1 Mannich product with 500 grams of SAE–

5W oil, and then add 2 moles of hexanal and 2 moles of 2-methyl-3-octanone. Heat the reaction mixture for several hours and inject nitrogen to remove water. An alkaline additive so prepared is oil soluble.

Example IX

This example is substantially the same as Example VIII with the exception that Type 2 Mannich product is used in place of Type 1 Mannich product.

The above examples have been presented merely to illustrate the preferred embodiments of our invention. Those skilled in the art will immediately appreciate that these examples can be changed in many details. For example, other aldehydes, ketones, and Mannich products coming within the scope of our disclosure will react similarly to those illustrated in the examples.

We claim:
1. The condensation product produced by the process of reacting (a) formaldehyde; (b) an alkylene polyamine coming within the the following formula:

in which $n$ is an integer from 1 to 10, and alkylene is a saturated divalent hydrocarbon having from 2 to 8 carbon atoms; (c) a methyl-substituted amino pyridine; and (d) an $C_2$–$C_{18}$ aldehyde reactant or a $C_2$–$C_{18}$ ketone reactant, or a mixture of said aldehyde reactants and ketone reactants; said formaldehyde, polyamine and substituted pyridine being reacted in the respective molar ratios of about 1–2:1–2:1, and said aldehyde reactant and/or ketone reactant being reacted in an amount sufficient to impart oil solubility to the product in motor oils.

2. The condensation product defined in claim 1 wherein the formaldehyde, polyamine and substituted pyridine, and the aldehyde reactant and/or ketone reactant are reacted in the respective molar ratios of about 1–2:1–2:1:1–4.

3. The condensation product defined in claim 2 wherein the aldehyde reactant and/or ketone reactant have at least 6 carbon atoms.

4. The condensation product defined in claim 3 wherein the aldehyde reactant and/or ketone reactant have from about 6 to about 18 carbon atoms.

5. The condensation product defined in claim 2 wherein the methyl-substituted pyridine is 2-amino-4,6-dimethyl pyridine.

References Cited
UNITED STATES PATENTS 2,606,265   7/1952   Gunther _____ 260–296
2,678,333   5/1954   Hartough et al. _____ 260–296

ALAN L. ROTMAN, Primary Examiner

U.S. Cl. X.R.

252—51.5; 260—239, 268, 583, 593, 601, 619, 624, 626